United States Patent [19]
Scott et al.

[11] Patent Number: 5,469,398
[45] Date of Patent: Nov. 21, 1995

[54] SELECTABLE WIDTH, BRUSTABLE FIFO

[75] Inventors: Michael Scott, Seal Beach; David Browning, Yorba Linda; Michael Holt, Mission Viejo, all of Calif.

[73] Assignee: Silicon Systems, Inc., Tustin, Calif.

[21] Appl. No.: 757,476

[22] Filed: Sep. 10, 1991

[51] Int. Cl.$^6$ ................................ G11C 13/00
[52] U.S. Cl. ........................... 365/221; 365/73
[58] Field of Search ..................... 365/221, 219, 365/220, 73, 230.08

[56] References Cited

U.S. PATENT DOCUMENTS

3,763,480  10/1973  Weimer ........................ 365/189.01

Primary Examiner—Terrell W. Fears
Attorney, Agent, or Firm—Hecker & Harriman

[57] ABSTRACT

A selectable width, burstable FIFO is described. A register memory stores x-bit and y-bit data. Each register of the register memory is y+1 bits wide. Y bits store x-bit and y-bit data and 1-bit tracks the data width within each register. A Burst Ready Logic means accepts an m-bit input to select a burst length from $2^m$ possible burst lengths. Based on the m-bit input, the Burst Ready Logic outputs a signal indicating when the FIFO is burstable. The empty and full FIFO conditions are determined using a digital hysteresis. In one embodiment, the FIFO is used in an IBM-AT environment. Eight registers store 8-bit and 16-bit data. Each register is 17-bits wide so that 16-bits store 8-bit and 16-bit data. The remaining bit tracks whether the register contains 8-bit or 16-bit data. In this embodiment, the Burst Ready Logic accepts a 2-bit input to select from possible burst lengths of 1, 2, 4 or 8 bytes.

58 Claims, 10 Drawing Sheets

| CNT (576) | Operation | Condition of FIFO 10 | Can Burst be signaled? |
|---|---|---|---|
| 0 | Write to FIFO | Full | No |
| 0 | | Empty | Yes |
| 0 | Read from FIFO | Full | Yes |
| 0 | | Empty | No |

SELECTABLE WIDTH, BRUSTABLE FIFO

BACKGROUND OF THE INVENTION

1. Field of the Invention

This invention relates to the field of data storage in computer systems, and in particular, to bi-directional, first-in, first-out (FIFO) data storage in computer systems.

2. Background Art

Figure 7:
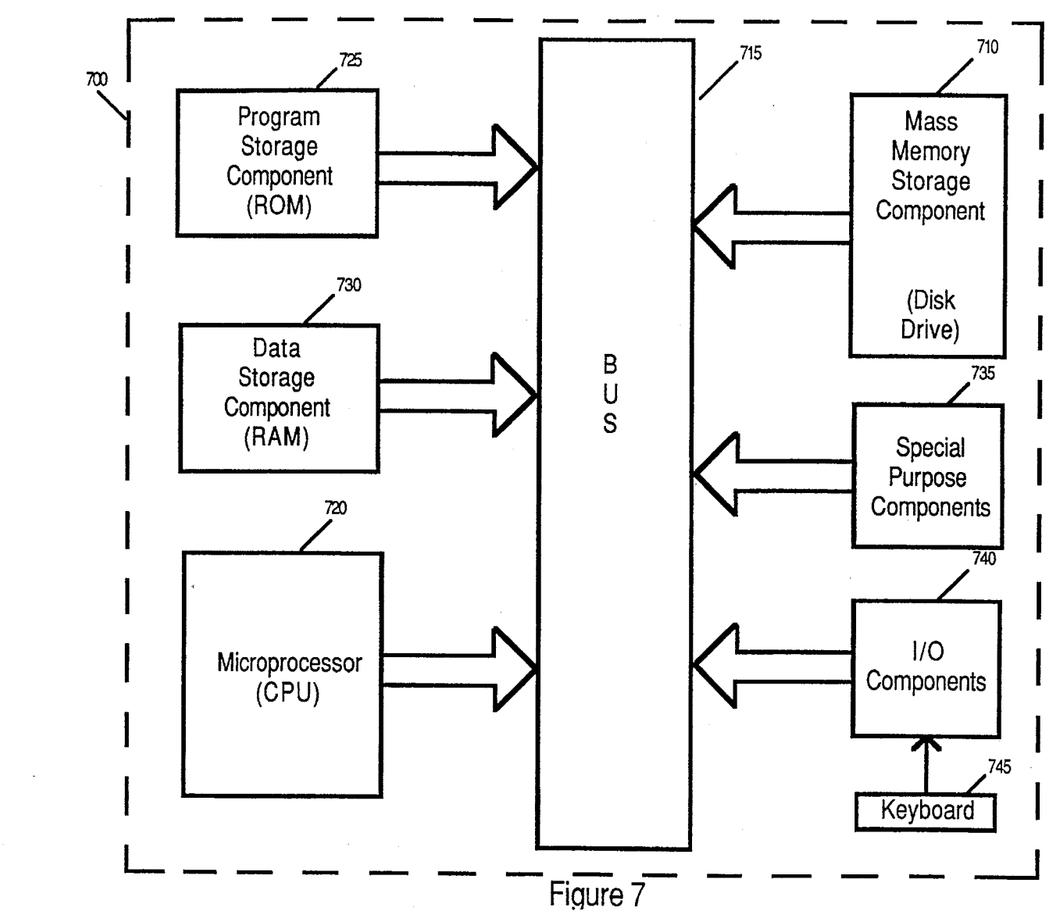
FIG. 7 illustrates a block diagram of a typical computer system.

A typical computer system consists of a number of modules or components as shown in FIG. 7. Computer systems typically include a central processing unit (CPU) such as a microprocessor 720. The microprocessor is a program-controlled device that obtains, decodes and executes instructions. The computer system includes program storage components such as read only memory (ROM) 725 for storing program instructions. The computer system also includes data storage components such as random access memory (RAM) 730 and mass memory 710 for storing data. The CPU 720 and the storage components 710, 725 and 730 transfer data over a bus 715.

The computer system typically also includes input/output (I/O) components 740 for connecting external devices such as a keyboard 745 to the microprocessor 720. Special purpose components 735, such as memory management units or co-processors, may also be part of the computer system.

The RAM data storage component 730, also known as a "main memory", is a scarce resource that is dynamically allocated to users, programs or processes. Main memory RAM 730 is typically silicon-based. In many applications, dynamic random access memory (DRAM) is used as the main memory 730. Main memory 730 is "byte" organized. That is, memory is arranged as a sequence of 8-bit bytes and the byte is the smallest unit of information accessed out of the memory. In some implementations, 16-bit words (2 bytes) or 32-bit words (4 bytes) are accessed at one time.

The mass memory 710 stores data on disks and typically employs magnetic, optical, magneto-optical or other types of media for information storage. Due to the capacity and the amount of control required to operate the disks, access times to data are quite slow as compared to microprocessor speeds. Thus, the microprocessor 720 uses a data storage area with a faster access time in the form of main memory RAM 730 as previously described.

The storage capacity of main memory 730 is often much less than that of mass memory 710. Main memory 730 is used to store relatively small amounts of data for current use by the microprocessor 720. The faster access time of main memory 730 is closer to the processing speed of the computer. Therefore, the system can operate at higher speeds than if data in current use is accessed from the disk.

To utilize the unique characteristics of the storage areas 710 and 730, data is transferred from main memory 730 to the mass memory 710 for future use, and from the mass memory 710 to main memory 730 for current use.

Figure 8:
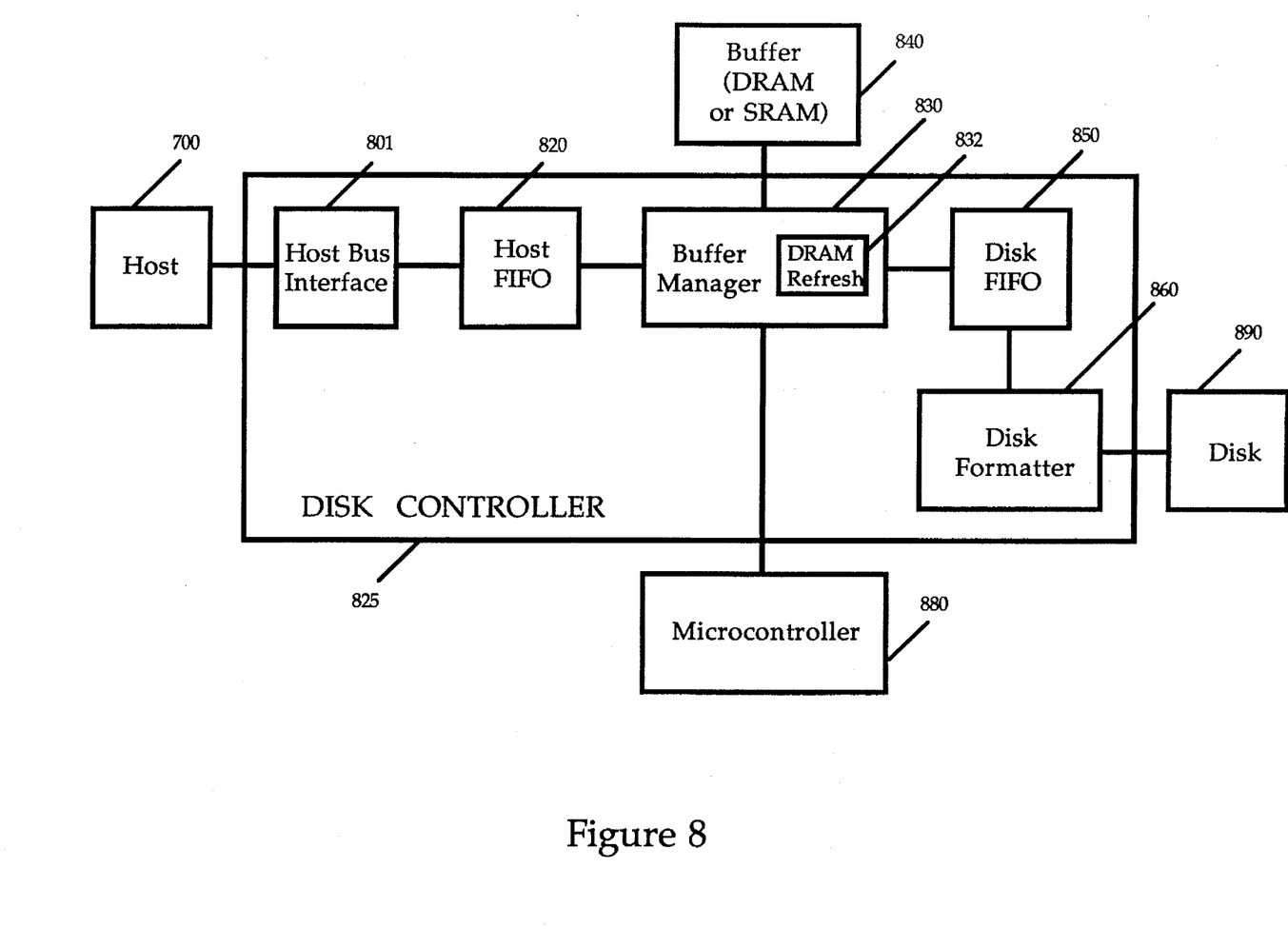
FIG. 8 illustrates a simplified block diagram of the disk controller as used in a computer system.

To operate the mass memory 710, a disk controller 825 is provided as shown in FIG. 8. Among other functions, the disk controller 825 controls rotation of the disks and positions the read/write heads. The disk controller 825 also manages requests to access the disk 890.

One part of the disk controller 825 is the buffer 840. The buffer 840 provides an "intermediate" storage area before data is written to the disk 890 or transferred from the disk 890 to main memory 710. The buffer 840 is typically smaller than main memory 710 and may be 8 kilobytes up to 1 megabyte. In today's advanced disk drive systems, the buffer 840 may be implemented in DRAM or SRAM. Access to the disk 890 is gained by accessing the disk controller's 825 buffer 840.

Buffer 840 access requests are handled by a buffer manager 830. Buffer 840 access requests originate from a plurality of sources. For example, in one disk controller, the buffer manager 830 handles buffer access requests from four sources. First, a host bus computer 700 may request buffer 840 access via the disk controller's 825 host bus interface 801. Second, the disk controller's 825 disk formatter 860 may also request buffer 840 access in order to transfer data to or from the disk drive. The disk drive's embedded microcontroller 880 may also request access to the buffer 840. The DRAM refresh circuitry 832, if a DRAM buffer is used, can be a fourth source of requests for buffer 840 access.

FIG. 8 shows a simplified block diagram of the disk controller as used in a computer system. The disk controller 825 contains a host bus interface 801 coupled to a FIFO 820. The buffer manager 830 is coupled to the FIFO 820, a FIFO 850 and the buffer 840. A disk formatter 860 is also coupled to the FIFO 850. The host bus interface 801, the disk formatter 860 and the buffer manager 830 operate asynchronously with respect to each other.

Therefore, the FIFO's 820 and 850 allow for efficient data transfer. To illustrate, consider the case of reading data from the disk 890. Without FIFO's 820 and 850, the disk formatter 860 transfers data directly to the buffer 840 via the buffer manager 830. During this time, requests to access the buffer cannot be serviced since the buffer manager 830 is servicing the disk formatter's 860 request. After the disk formatter 860 has filled the buffer 840 with data, the host's 700 request can be serviced by the buffer manager 830. Therefore, the data can be read from the buffer 840 into main memory 710. Thus, the host computer 700 must sit idle until the disk formatter 860 is finished accessing the buffer 840.

If the FIFO's 820 and 850 are used, the buffer manager 830 can multiplex between the host bus interface 801, the disk formatter 860, the embedded microcontroller 880 and the DRAM refresh circuitry 832. The FIFO's 820 and 850 enable the buffer manager 830 to multiplex without causing the host bus interface 801 or disk formatter 860 to suffer delays in servicing their data requests. The FIFO's 820 and 850 also allow the host bus interface 801 and disk formatter 860 to transfer data from or to the buffer 840 simultaneously. In the same example of reading data from the disk, the buffer manager 830 could fill the host bus interface's 801 FIFO 820 with data and then retrieve data from the disk formatter's 860 FIFO 850. Next, the data from the disk formatter's 860 FIFO 850 can be stored in the buffer 840 at the same time the host 700 retrieves the data from the host bus interface's 801 FIFO 820. From the host's 700 and disk formatter's 860 perspective, it appears that each has immediate access to the buffer 840 while suffering minimal delay in response to their data servicing requests. In reality, the buffer manager 830 is multiplexing between (possibly) four sources of request for buffer access: the host bus interface 801, the disk formatter 860, the embedded microcontroller 880 of the disk drive, and the DRAM refresh circuitry 832 (if a DRAM buffer is used).

If a DRAM buffer 840 is used in the disk controller 825, transfers between the buffer 840 and the FIFO 850 can use page mode access techniques. In page mode, data is transferred in blocks or bursts rather than one byte at a time. The number of bytes transferred in a burst is known as the burst length. Page mode can be performed as burst transfers or demand transfers.

In burst transfer mode, the burst length represents the number of bytes that are transferred between the buffer 840 and the FIFO 850. For reads from the FIFO 850, the buffer manager grants the FIFO 850 buffer access when the FIFO 850 contains at least as many bytes as the burst length. For writes to the FIFO 850, the buffer manager 830 does not transfer data to the FIFO 850 until the FIFO 850 has at least as many empty bytes as the burst length.

In demand transfer mode, the burst length represents the maximum number of bytes transferred during one buffer access request. A read from the FIFO 850 to the buffer 840 can occur at any time when the FIFO 850 is not empty. Thus, reads from the FIFO 850 can occur when the FIFO 850 contains at least one data byte. For buffer writes, the buffer manager 830 can initiate a transfer when the FIFO 850 has at least one open byte to store data. The burst length again provides the maximum number of bytes that can be transferred during one request. It follows that the number of bytes read from the FIFO 850 is equal to the smaller of the number of bytes in the FIFO 850 or the burst length. Similarly, the number of bytes written to the FIFO 850 is equal to the smaller of the number of empty bytes in the FIFO 850 or the burst length.

Prior art disk controller-FIFO systems support page mode in both burst and demand transfer modes. However, the burst length is set at a fixed number of bytes. The fixed burst length may not result in the most efficient transfer rate, and may, therefore, produce unnecessary delays due to the introduction of wait states at the host. Thus, data transfer rates as seen by the host are hindered. A programmable burst length allows for optimization of the transfer rate.

In DRAM, data can be thought of as being stored in a two-dimensional grid. The address of the data is composed of two parts: the row address and the column address. To transfer data, first the row address is placed on the DRAM's address bus and strobed, using the RAS (row address strobe) signal, and then the column address is placed on the DRAM's address bus and strobed using the CAS (column address strobe) signal. When doing a read, the DRAM places the data residing at the intersection of the selected row and column on its data bus while CAS is asserted; during a write, it takes the data off its data bus and stores it at the intersection of the selected row and column while CAS is asserted.

When using page mode, the first byte transferred has its row and column address strobed into the DRAM, but succeeding bytes, if they are in the same row, need only have their column addresses strobed in. Having to only strobe the column address can significantly decrease the time to access data from the DRAM. (Thus, if burst length is defined as four bytes, the first byte's row and column address are strobed, but the second, third and fourth bytes only have their column address strobed.)

There is an overhead (i.e., the time to strobe the row address) associated with starting a burst, so that the average time to access a data byte decreases as burst length increases, since average access time=(column address strobe time + (row address strobe time/burst length)). If there were no constraints, one could choose the maximum burst length possible, so as to maximize the data transfer rate. However, the disk controller's buffer manager is constrained by the fact that it must not allow the host and disk FIFO's to overflow or underflow. The flow of data into the disk FIFO during a disk read, or out of the disk FIFO during a disk write, cannot be stopped by the buffer manager, so it services the disk FIFO regularly. If the burst length chosen were too long, then the disk FIFO might overflow or underflow while the buffer manager is servicing a burst at the host FIFO. This imposes a constraint on the burst length. Furthermore, in some cases it is not possible to delay the host transfer process by inserting wait states so that the burst length must be chosen such that the host FIFO does not overflow or underflow.

FIFO's provide data storage for small amounts of data: typically a few bytes. The FIFO gets its name from the manner in which data is written to and read from the storage network. That is, data that is written first in time to the FIFO is the first in time to be read from the FIFO. The FIFO storage capacity is finite. Therefore, data may be written to the FIFO as long as space remains. That is, data may be written to the FIFO as long as it is not full. Conversely, data may be read from the FIFO until there is no data remaining, i.e., until it is empty.

Figure 1:
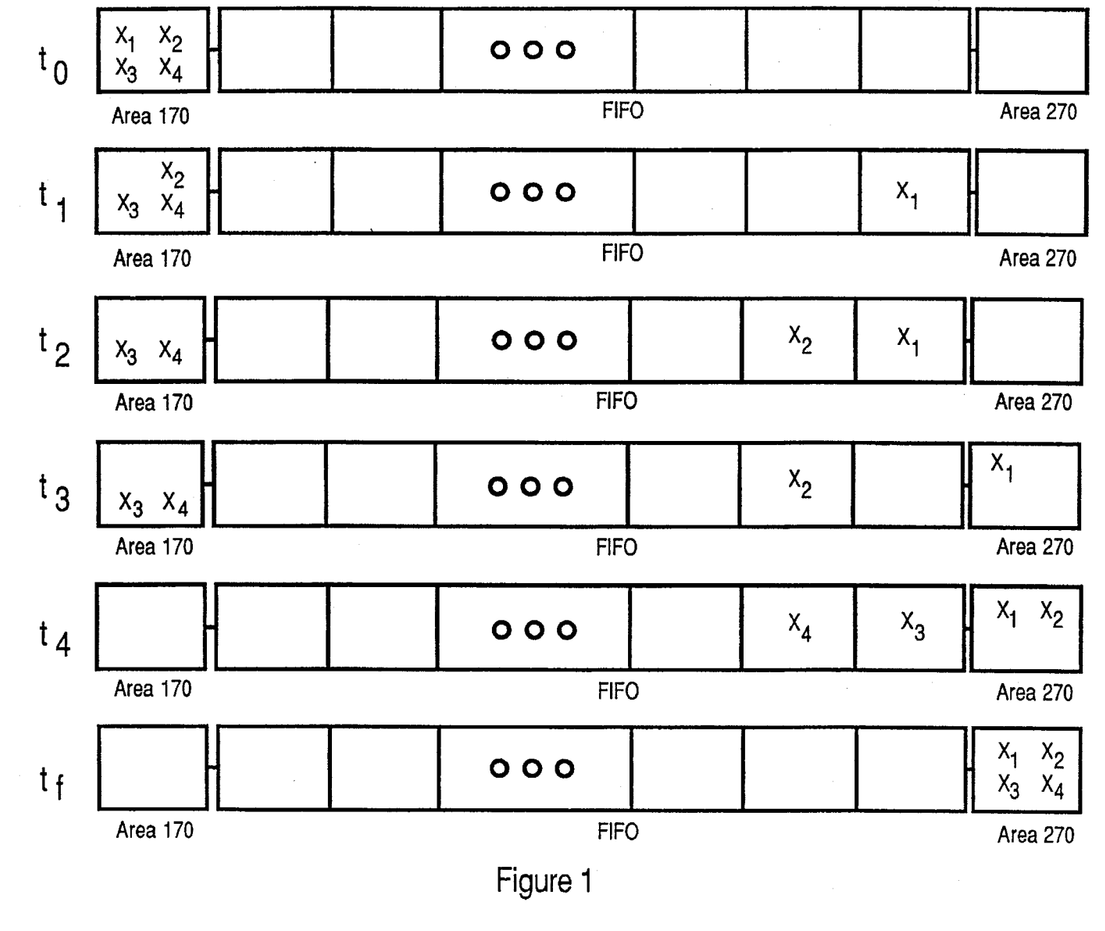
FIG. 1 illustrates the operation of a simple FIFO.

FIG. 1 serves to illustrate the operation of a simple FIFO. Suppose that the goal is to transfer data elements $X_1$ through $X_4$ from Area 170 to Area 270 using a FIFO. At time $t_o$, Area 170 contains elements $X_1$ through $X_4$ and the FIFO and Area 270 are empty. At time $t_1$, element $X_1$ is written to the FIFO. At time $t_2$, element $X_2$ is written to the FIFO. Time $t_3$ illustrates the situation where $X_1$ has been read from the FIFO to Area 270. Because $X_1$ is the first element written to the FIFO (at time $t_1$), it was also the first to be read from the FIFO. At time $t_4$, $X_2$, the second element in time to enter the FIFO, is written to Area 270. Also at time $t_4$, elements $X_3$ and $X_4$ are written to the FIFO and can be read from the FIFO to Area 270. At a final time $t_f$, all of the elements originally in Area 170 are in Area 270.

To accomplish 16-bit and 8-bit data transfers, prior art FIFO's employ a dual mode technique. That is, in one mode, 16-bit data is processed through the FIFO. After completion of the first 16-bit mode, a second 8-bit mode is initiated and an 8-bit data transfer sequence can be performed. Thus, the prior art FIFO's do not allow mixing of data types within the FIFO.

SUMMARY OF THE PRESENT INVENTION

The present invention is directed to FIFO data storage in computer systems. A dual port, bi-directional FIFO is coupled to a first device at port one and a second device at port two. The second device provides control signals to the FIFO and also stores data in a DRAM data storage area. At port one, x-bit or y-bit data is read from or written to the FIFO by the first device. At the same time, x-bit data is written to or read from the FIFO through port two by the second device. Control signals to the FIFO from the second device determine the direction of data transfer and configure the FIFO for reads and writes. S internal registers store x-bit and y-bit data simultaneously. An input to the FIFO indicates the width of incoming data as x-bits or y-bits. Each register is y+1 bits wide. Y-bits store x-bit and y-bit data and one width bit tracks the width of the data within each register. The FIFO supports page mode access of DRAM at port two in either burst mode or demand mode. Page mode DRAM access uses a programmable burst length to optimize FIFO throughput for a particular set of system parameters. The full and empty states of the FIFO are determined by digital hysteresis. Digital hysteresis aids in determining the full and empty states because FIFO reads and writes can occur asynchronously.

In the preferred embodiment of the present invention, FIFO's are used in a disk controller. One FIFO is provided between an IBM AT's host bus interface and the disk controller's buffer. A second FIFO is provided between the disk controller's buffer and the disk formatter's disk interface. Port one of the host bus interface FIFO is coupled to the AT interface via a 16-line bus to allow for 8-bit and 16-bit data transfer. At port two, buffer-disk controller data transfers are done over an 8-bit bus. Also, in the preferred embodiment, the host interface FIFO uses 8 internal registers that are each 17 bits wide: sixteen bits store 8-bit or 16-bit data and one width bit tracks the width of data currently in each register. The disk interface FIFO uses eight internal registers that are each 8 bits wide. The registers are selected internally using a 3-bit Gray code counter. The FIFO's burst length is programmable via a 2-line bus if the disk controller's buffer is implemented in DRAM. Hence, burst or demand transfers at port two can be performed in 1, 2, 4 or 8 byte bursts.

In prior art FIFO's, burst lengths in page mode access of DRAM are fixed. The fixed burst length introduces wait states at the host and thus hinders system performance. The FIFO of the present invention provides a performance advantage when used in a disk controller due to the programmable burst length. The programmable burst length allows for optimization of the data transfer rate as seen by the host since it can be selected to produce minimal delays in servicing the host's data requests. The FIFO of the present invention allows for mixing of data types by using a width tracking bit to indicate the size of the data within each register.

DETAILED DESCRIPTION OF THE INVENTION

A method and apparatus for providing FIFO data storage in computer systems is described. In the following description, numerous specific details are set forth in detail in order to provide a more thorough description of the invention. It will be apparent however, to one skilled in the art, that the present invention may be practiced without these specific details. In other instances, well known features have not been described in detail so as not to unnecessarily obscure the present invention.

Throughout the detailed description, reference is made to x-bit and y-bit data. For purposes of the description, y is less than or equal to 2x. Additionally, reference to a "byte" of data means an x-bit piece of data and reference to a "word" of data means a y-bit piece of data. In the preferred embodiment, y=16 and x=8. Thus, two 8-bit bytes make up one 16-bit word. However, other values and relationships can be implemented without departing from the scope of the present invention.

Figure 2:
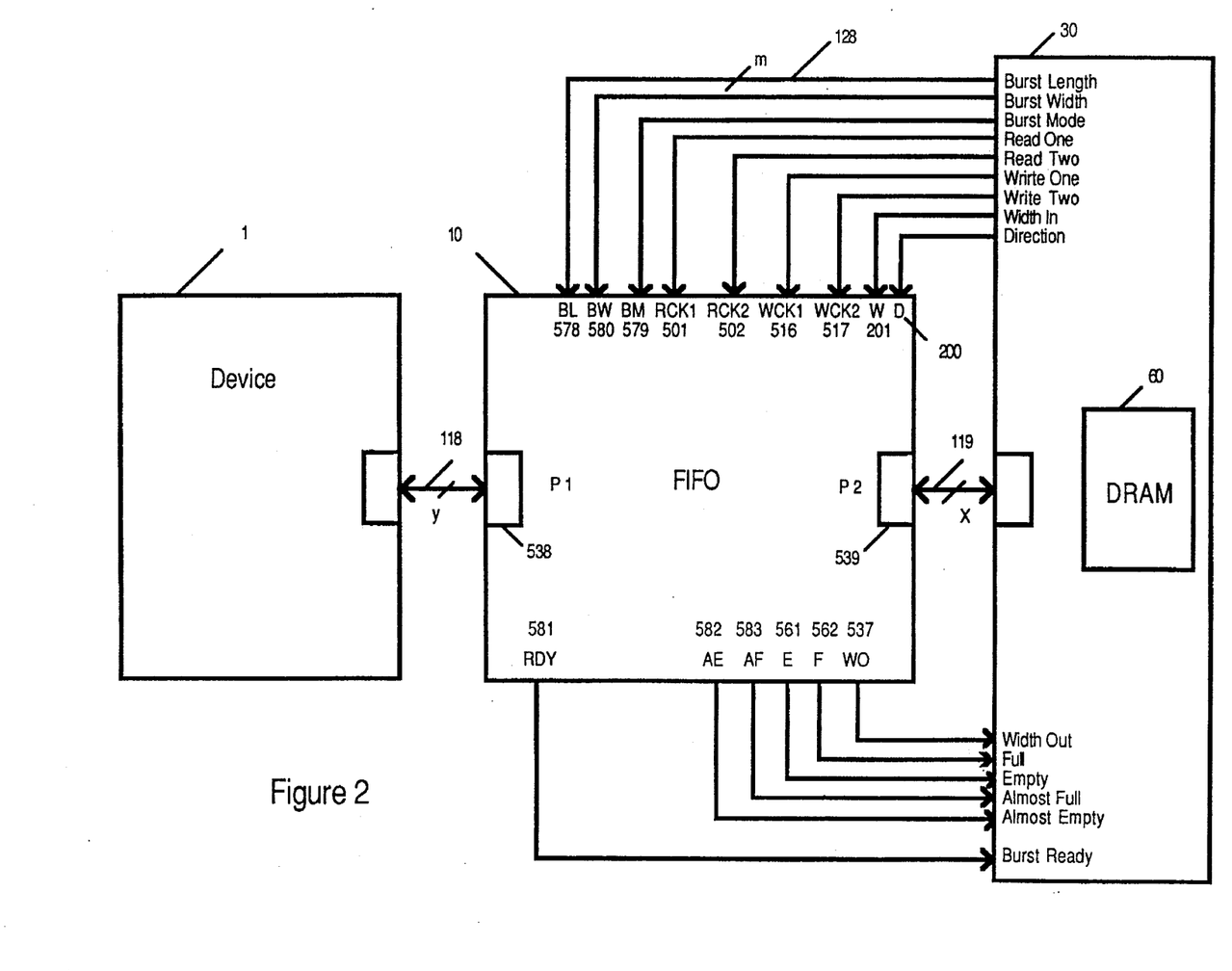
FIG. 2 illustrates the present invention in conjunction with a manager and a device.

An overview of the FIFO 10 of the present invention, a Manager 30 and a device I is shown in FIG. 2. In FIG. 2, data is transferred from device 1 to Manager 30 or from Manager 30 to device 1 through FIFO 10. Device 1 writes to or reads from FIFO 10 at the same time Manager 30 reads from or writes to FIFO 10. Data is transferred between device 1 and FIFO 10 over a y-line bus 118 through bi-directional port P1 538. Data is transferred between Manager 30 and FIFO 10 over an x-line bus 119 through bi-directional port P2 539.

The direction of data transfer through FIFO 10 is controlled by the inputs from Manager 30. Direction input D 200 determines the direction of data transfer. That is, direction input D 200 configures FIFO 10 for data transfers from device 1 to Manager 30 or from Manager 30 to device 1. Direction input D 200 also determines which clock inputs will be used by FIFO 10. Read clock inputs RCK1 501 and RCK2 502 are used by device 1 and Manager 30 respectively to read data from FIFO 10. When used, these read clock inputs cause data to be placed onto either the y-bit bus 118 or the x-bit bus 119 depending on direction input D 200. Write clock inputs WCK1 516 and WCK2 517 are used by device 1 and Manager 30 respectively to write data to FIFO 10. Direction input D 200 determines which write clock signal will be used. When WCK1 516 or WCK2 517 is used, data is taken off of y-bit bus 118 or x-bit bus 119 and stored in FIFO 10.

X-bit and y-bit data written to FIFO 10 is stored in S internal registers. Each register is y+1 bits wide. Y-bits store x-bit and y-bit data and one width bit tracks the width of data in the register.

Width input W 201 provides the width of data written to FIFO 10. The width input value is stored with the data in the corresponding width bit. The width bit provides the width of data read from FIFO 10 over width output WO 537.

The FIFO 10 of the present invention is burstable at bi-directional port P2 539. That is, the DRAM storage area 60 of Manager 30 allows data transfers at P2 539 to be performed using page mode access. In page mode, multiple byte bursts rather than single byte transfers are performed to increase the data transfer rate.

Burst mode input BM 579 determines whether transfers at P2 539 are executed as burst transfers or demand transfers. For burst mode transfers, BM 579 is asserted. In burst mode, burst ready output RDY 581 indicates whether a multiple byte data transfer, of a length defined by the burst length input BL 578, can be performed at P2 539. If BM 579 is not asserted, data transfers at P2 539 are done in demand transfer mode. In demand mode, RDY 581 is asserted and data can be read from FIFO 10 if it is not empty and written to FIFO 10 if it is not full. In demand mode, the burst length input BL 578 defines the maximum number of bytes that can be transferred during one request.

In demand mode, FIFO 10 uses almost empty output AE 582 and almost full output AF 583 to allow Manager 30 to switch to a different task efficiently. During reads from FIFO 10, almost empty output AE 582 signals Manager 30 if there is only one data byte in FIFO 10. Thus, Manager 30 is signaled before FIFO 10 is actually empty in which case a demand transfer must end. This allows Manager 30 to switch to a different task efficiently. Almost full AF 583 is output to Manager 30 during writes to FIFO 10 if there is only space for one more data byte. Therefore, Manager 30 is signaled before FIFO is actually full. Thus, Manager 30 can switch to a different task efficiently. Each of these signals are byte based and not word based. Therefore, data width is taken into account.

One of the novel features of the present invention is that the burst length is programmable or selectable. That is, Manager 30 can select a burst length over m-line bus 128. For example, if m=2, FIFO 10 can be programmed for one of 4 different burst lengths. The programmable burst length allows FIFO 10 to be "tuned" to produce minimal delays in servicing the requests of device 1.

FIFO 10 may become empty during reads if it does not contain any data. In this case, no more data can be read and FIFO 10 asserts empty signal E 561. During writes to FIFO 10, the full input F 562 is asserted to indicate that each of the S registers contain data. Hence, no more data can be written to FIFO 10.

To assert the empty E 561 and full F 562 signals, FIFO 10 employs a unique method of a digital hysteresis. That is, the history of FIFO 10 states is tracked by FIFO 10. The digital hysteresis of the present invention uses the states of "nearly full" and "nearly empty" and is described in further detail in the description that follows.

Figure 5:
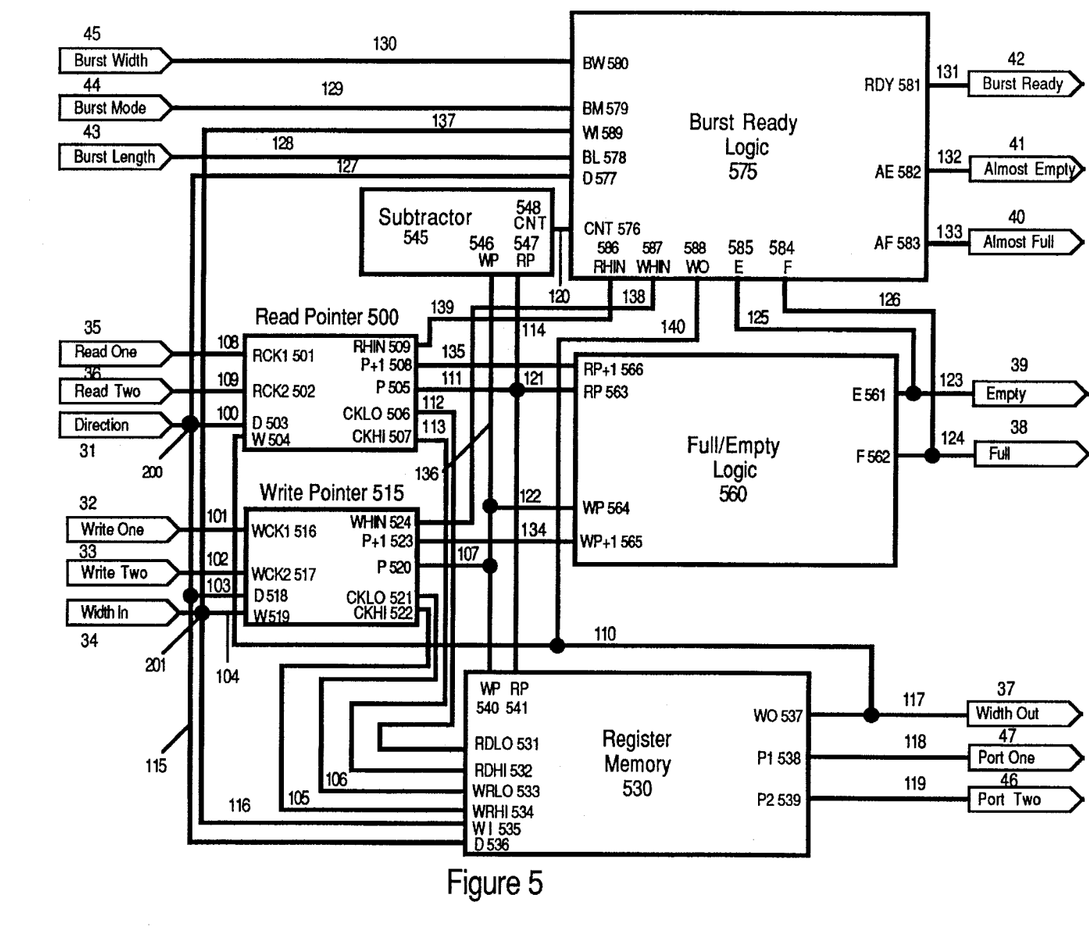
FIG. 5 illustrates a detailed block diagram of the present invention.

A detailed block diagram of the present invention is illustrated in FIG. 5. A Manager 30 provides control signals to FIFO 10 and transfers data through bi-directional port P2 539 over x-line bus 119. A device 1 transfers data through bi-directional port P1 538 over y-line bus 118. A Register Memory 530 stores x-bit and y-bit data in S internal registers. Each register is y+1 bits wide. Each register uses y-bits to store x-bit and y-bit data and one width bit to track the width of the data within each register. Read Pointer 500 provides a first pointer P505 to select one of the S registers from which to read. Write Pointer 515 provides a second pointer P520 to select one of the S registers to which to write. Read Pointer 500 and Write Pointer 515 also provide third and fourth pointers P+1 508 and P+1 523 and clock signals to read and write data. Subtractor 545 provides Burst Ready Logic 575 with the difference between the first and second pointers to determine the number of data words in FIFO 10. Burst Ready Logic 575 signals Manager 30 if page-mode transfers at P2 539 can be performed. Full/Empty Logic 560 signals Manager 30 and Burst Ready Logic 575 if FIFO 10 is "empty" or "full".

Referring to FIG. 5, Write Pointer 515 provides clock signals CKLO 521 and CKHI 522 to Register Memory 530. CKLO 521 is coupled through line 106 to input WRLO 533. CKHI 522 is coupled through line 105 to input WRHI 534. An n-bit output P 520 is coupled to n-line bus 136 through n-line bus 107. An n-bit output P+1 523 is coupled to Full/Empty Logic 560 input WP+1 565 through an n-line bus 134. Output WHIN 524 is coupled through line 138 to input WHIN 587 of Burst Ready Logic 575.

Manager 30 output Direction 31 is coupled through line 103 to direction input D 518. Write One 32 is coupled through line 101 to WCK1 516. Write Two 33 is coupled to the WCK2 517 input through line 102. Manager 30 output Width In 34 is coupled to input W 519 through line 104.

Read Pointer 500 provides clocks signals CKLO 506 and CKHI 507 to Register Memory 530. CKLO 506 is coupled through line 112 to input RDLO 531. CKHI 507 is coupled through line 113 to RDHI 532. An n-bit output P 505 is coupled through n-line bus 111 to n-line bus 114. Another n-bit output P+1 508 is coupled through n-line bus 135 to the RP+1 input 566 of Full/Empty Logic 560. Output RHIN 509 is coupled through line 139 to input RHIN 586 of Burst Ready Logic 575.

Manager 30 output signal Direction 31 is coupled through line 100 to input D 503. Read One 35 is coupled through line 108 to the RCK1 501 and Read Two 36 is coupled to the RCK2 502 input through line 109. Read Pointer width input W 504 is coupled through line 110 to Register Memory 530 output WO 537.

Register Memory 530 is coupled to Manager 30 Direction 31 output through line 115 at input D 536. Input WI 535 is coupled through line 116 to Manager 30 output Width In 34. Output WO 537 is coupled through line 117 to the Width Out 37 input of Manager 30. Inputs WP 540 and RP 541, each consisting of n-bits, are coupled to n-line buses 136 and 114 respectively. Y-bit bi-directional port P1 538 is coupled to port one 47 of device 1 through y-line bus 118. Bi-directional port P2 539, consisting of x-bits, is coupled to Manager 30 port two 46 through x-line bus 119.

Subtractor 545 provides output CNT 548 to Burst Ready Logic 575. CNT 548 is coupled to Burst Ready Logic 575 input CNT 576 through an n-line bus 120. Subtractor input WP 546 is coupled to n-line bus 136 and input RP 547 is coupled to n-line bus 114.

Full/Empty Logic 560 signals Manager 30 when FIFO 10 is full or empty. Full/Empty Logic 560 output F 562 is coupled to Manager 30 input Full 38 through line 124 and output E 561 is coupled to input Empty 39 through line 123. Full/Empty Logic 560 accepts input through RP 563 which is coupled to n-line bus 114 through n-line bus 121. Input WP 564 is coupled through n-line bus 122 to n-line bus 136.

Burst Ready Logic 575 determines when bursts can be performed by Manager 30. RDY output 581 is coupled through line 131 to the Burst Ready 42 input of Manager 30. Outputs AE 582 and AF 583 are coupled to Manager 30 inputs Almost Empty 41 and Almost Full 40 through lines 132 and 133, respectively. Burst Ready Logic 575 input F 584 is coupled to Full/Empty Logic 560 output F 562 through line 126. Input E 585 is coupled through line 125 to Full/Empty Logic 560 output E 561. Input D 577 is coupled to Manager 30 output Direction 31 through line 127. M-bit input BL 578 is coupled through m-line bus 128 to the Burst Length 43 output of Manager 30. Input BM 579 is coupled to Manager 30 output Burst Mode 44 through line 129 and input BW 580 is coupled through line 130 to Burst Width output 45 of Manager 30. Input WI 589 is coupled through line 137 to Manager 30 output Width n 34. Input WO 588 is coupled through line 140 to line 110.

Still referring to FIG. 5, Write Pointer 515 consists primarily of an n-bit counter. Output P 520 provides the state of the counter via n-line bus 111. Counter output P 520 selects one of the S registers to write to in Register Memory 530. Output P+1 523 provides Full/Empty Logic 560 with the subsequent value of the n-bit counter through n-line bus 134. For example, in the preferred embodiment, a 3-bit Gray code counter is used. Therefore, if P=001 then P+1=011. P+1 523 is used to determine the full and empty conditions of FIFO 10.

Figure 6A:
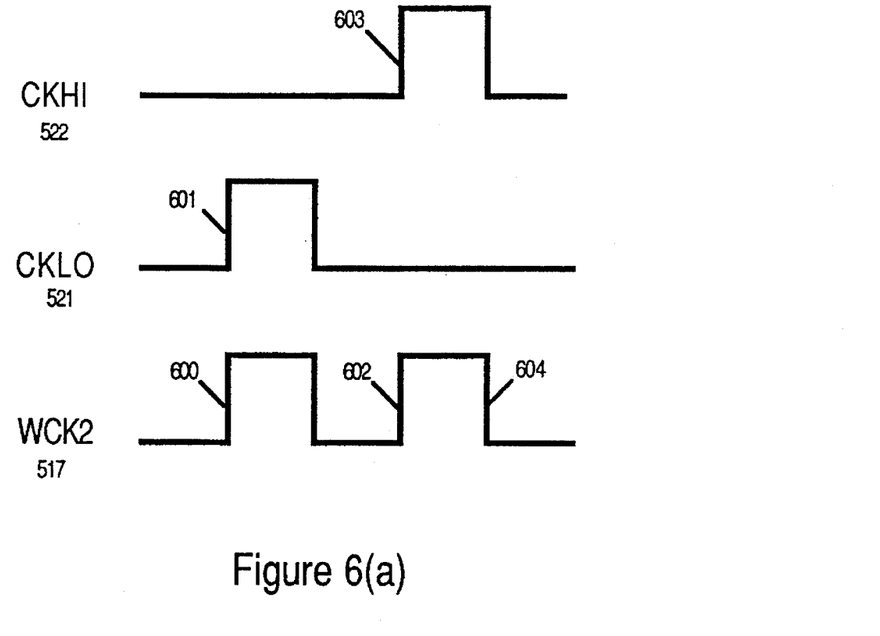
FIG. 6(a)–6(c) illustrate various clock and pulse outputs generated when data are written to the bi-directional ports.

The n-bit counter of Write Pointer 515 is clocked by either WCK1 516 or WCK2 517 depending on direction input D 518. If D 518 indicates that WCK2 517 is being used, FIFO 10 is configured for writes through bi-directional port P2 539. In this case, if input W 519 indicates that y-bit data is to be transferred over x-line bus 119, two subsequent clock signals CKLO 521 and CKHI 522 are provided to Register Memory 530. As shown in FIG. 6a, a first dock pulse 600 at WCK2 517 causes a pulse 601 at CKLO output 521. A subsequent pulse 602 at WCK2 517 produces a pulse 603 at output CKHI 522. On the falling edge 604 of the second WCK2 517 pulse, the n-bit counter is incremented so that output P 520 selects the next register to write to in Register Memory 530.

Figure 6B:
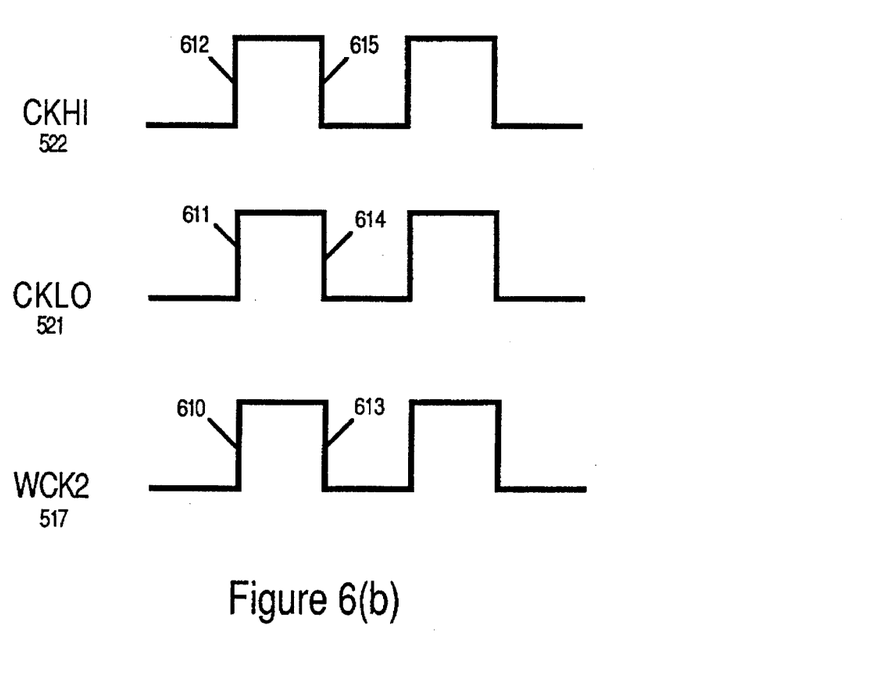

Bi-directional port P2 539 is used to write x-bit data to FIFO 10. In this case, WCK2 517 is again selected, but W 519 indicates x-bit data is to be written. Since x-bit data is to be written over an x-line bus, clock signals CKLO 521 and CKHI 522 are output to Register Memory 530 simultaneously. FIG. 6b illustrates this situation. Pulse 610 triggers CKLO 521 pulse 611 and CKHI 522 pulse 612 at the same time. As pulses 613, 614 and 615 fall, the n-bit counter of Write Pointer 515 is incremented. P 520 selects the next register to write to in Register Memory 530.

Figure 6C:
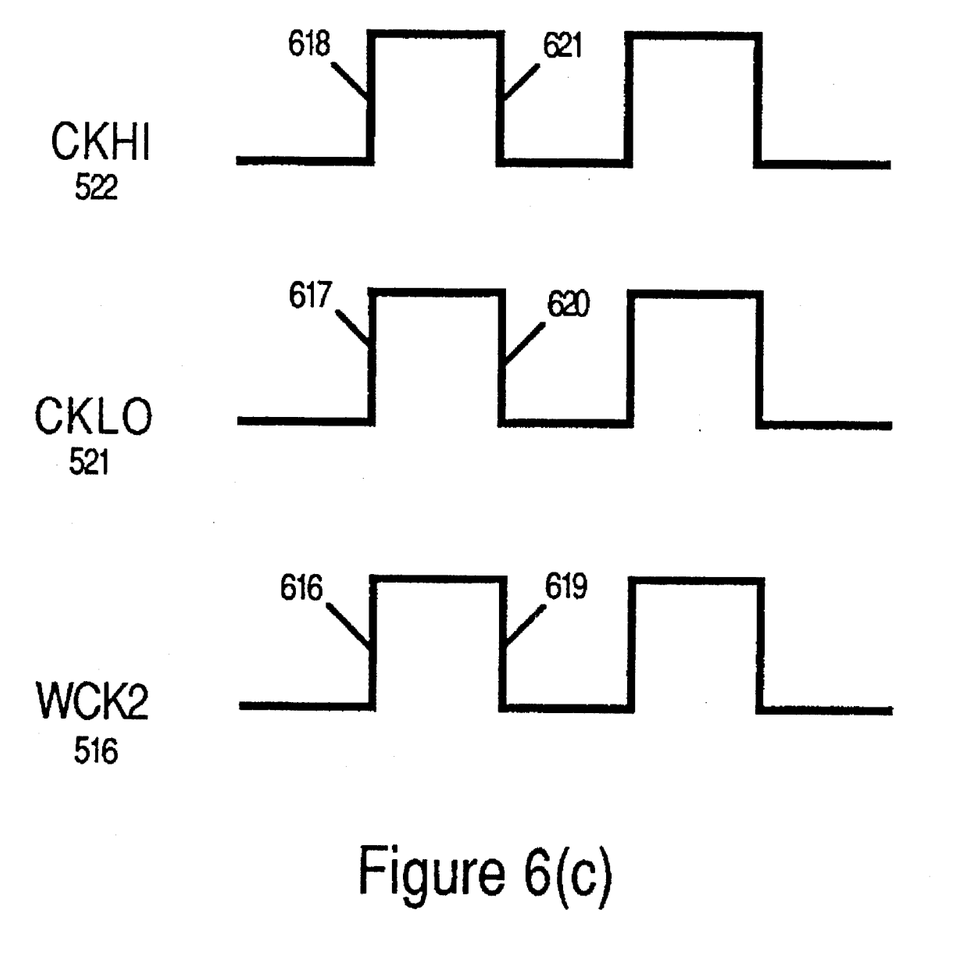

For writes to FIFO 10 through bi-directional port P1 538, CKLO 521 and CKHI 522 are output as shown in FIG. 6c. Regardless of whether y-bit or x-bit data is to be written through port P1 538, WCK1 516 pulse 616 and CKLO 521 and CKHI 521 pulses 617 and 618 are generated at the same time. Counter output P 520 is incremented on the falling edges 619, 620 and 621 and selects the next register to write to in Register Memory 530. In each of these circumstances, subsequent counter output P+1 523 is provided to Full/Empty Logic 560.

Read Pointer 500 is the functional equivalent of Write Pointer 515. Read Pointer 500 consists primarily of an n-bit counter and provides output P 505 through n-line bus 111 to indicate the state of the counter. Subsequent counter output P+1 508 is provided through n-line bus 135 to Full/Empty 560 to determine the full and empty conditions of FIFO 10.

Read Pointer 500 is clocked by input RCK1 501 or RCK2 502. Direction input D 503 indicates that either RCK1 501 or RCK2 502 is selected. For data reads from FIFO 10 to device 1 through port P1 538, RCK1 501 is selected. For reads from FIFO 10 to Manager 30 through port P2 539, RCK2 502 is selected. Input W 504, taken from Register Memory 30 output WO 537, serves the same function as input W 519 to Write Pointer 515. Thus, W 504 indicates the width of data being read from FIFO 10. Therefore, W 504 controls whether CKLO 506 and CKHI 507 are pulsed simultaneously by RCK2 502 (similar to FIG. 6b) or by subsequent RCK2 502 pulses (similar to FIG. 6a). Simultaneous clock pulses occur when there is a y-bit or x-bit read through port P1 538 and also when an x-bit read occurs through port P2 539. In these cases, output P 505 is incremented on the falling edges of the pulses. If a y-bit data read occurs through port P2 539, a first pulse at RCK2 502 will pulse CKLO 506 while a second pulse at RCK2 502 will pulse CKHI 507. Output P 505 is incremented on the falling edge of the second pulse at RCK2 502. In each of these cases, output P 505 indicates the next register from which to read in Register Memory 530. In each case, P+1 508 provides the subsequent counter state to Full/Empty Logic 560.

In the preferred embodiment, the n-bit counters of Read Pointer 500 and Write Pointer 515 are 3-bit Gray code counters. The Gray code counters prevent problems determining the Full/Empty Logic signals E 561 and F 562. Thus, the Gray code counters make determination of the empty and full conditions of FIFO 10 relatively easy, and free of hazard and race conditions.

As previously discussed, the FIFO 10 of the present invention receives, outputs, and stores x-bit and y-bit data. Register Memory 530 provides the data storage area for FIFO 10. Register Memory 530 uses a plurality of registers R(1) through R(S) to store S bytes or words or any combination of S bytes and words. Each register R is selected using n-lines; therefore, to select each of the S registers, S is less than or equal to $2^n$. During reads from FIFO 10, RP 541 selects one of the S registers from which to read data. WP 540 selects one of the S registers to write to during FIFO writes.

The present invention allows x-bit or y-bit data to be stored in FIFO 10 simultaneously in registers R(1) through R(S). For example, register R(1) can store x-bit data and registers R(2) and R(3) can store y-bit data. In the case of x-bit data, the lower x-bits of the registers are used to store the data. The width of the registers is dependent on the data widths x and y. Since y is less than or equal to 2x, the width of each register must be at least equal to y. The width of the data enters into various operations and calculations. Therefore, the width of the data must be tracked. The present invention provides a novel method of tracking data width: it adds one bit to each register to track the width of the data within the register. Thus, each register has one bit associated with it to track the width of the data currently in the register. It follows that each register R has a width of y +1.

In one embodiment, the FIFO of the present invention is used in a disk controller. The disk controller is used in an IBM-AT environment. The host bus interface is defined by the ATA Standard which requires both 16-bit and 8-bit data transfers. Ordinary data transferred on the AT bus is 16-bits wide. However, the Read Long and Write Long commands require 8-bit error check data to be appended to a block of ordinary data.

Therefore, in this embodiment, eight registers are used to store 8-bit and 16-bit data. The 3-bit Gray code counter states are output over three lines to select each of the 8 registers. Each register is 17 bits wide. Sixteen bits store 8-bit and 16-bit data. The width bit of each register indicates that the contents of the register is either 16-bits or 8-bits. The width bit allows proper control of the IBM-AT host bus interface IOCS16__signal for transfers to the host. IOCS16__ tells the host whether 8-bit or 16-bit data is being transferred.

Figures 4A, 4B, 4C:
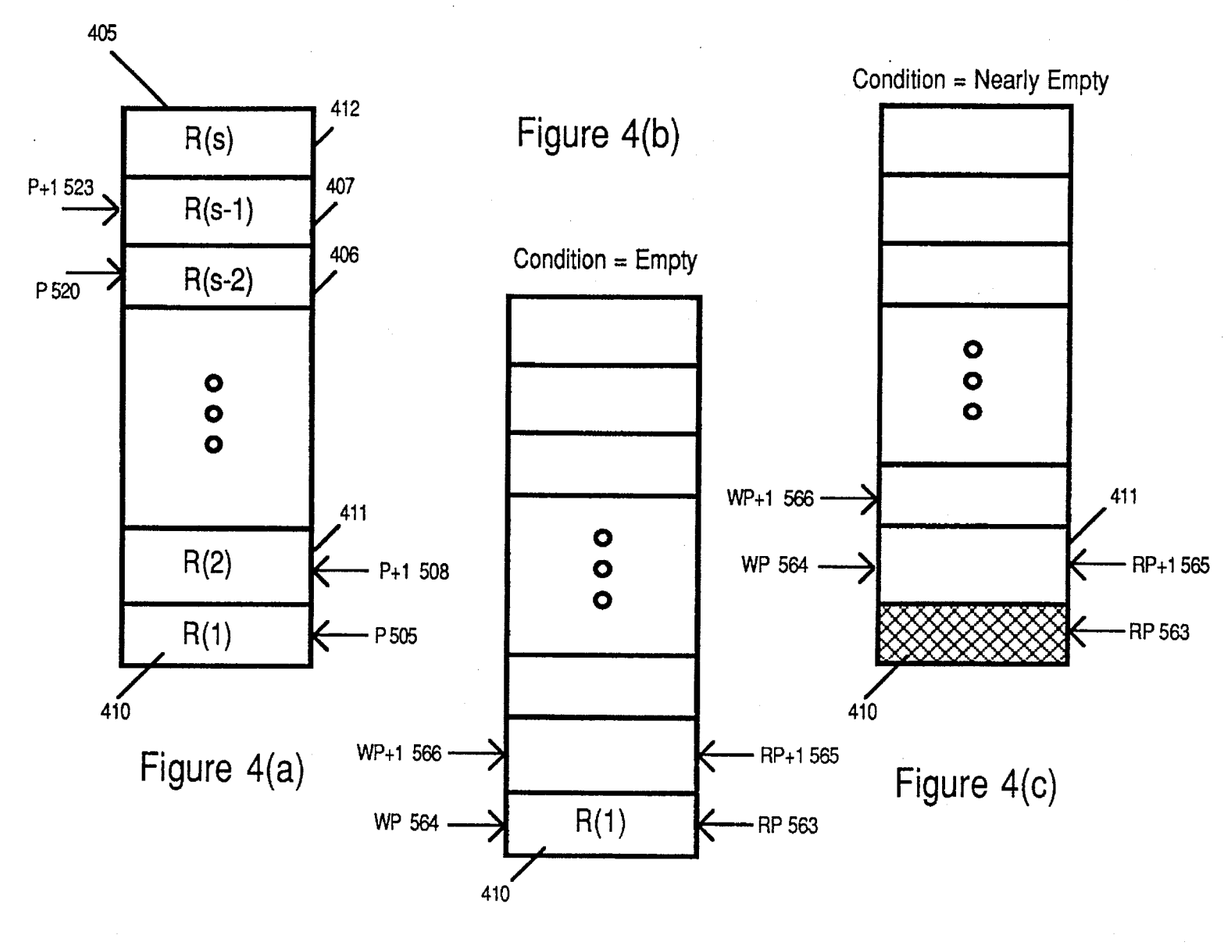
FIG. 4(a)–4(e) illustrate the positions of the read and write pointers for varying FIFO statuses.

Referring to FIG. 4a, registers R(1)through R(S) of Register Memory 530 are illustrated by block 405. Each of the S registers are depicted beginning with R(1) 410 and R(2) 411. The numbering sequence continues through R(S) 412.

The RP 541 input, taken from P 505, selects one of the S registers from which to read data. In FIG. 4a, register R(1) 410 is selected. The P 505 output is also provided to Subtractor 545 and Full/Empty Logic 560. Additionally, a subsequent counter output P+1 508 has the relationship to P 505 as shown in the figure. Thus, subsequent counter output P+1 508 indicates the next value of P 505 if data is read from FIFO 10. Therefore, if data is read from R(1) 410, data would next be read from R(2) 411.

The WP 540 input, taken from P 520, selects one of the S registers to which to write data. In FIG. 4a, R(S-2) 406 is selected. Output P 520 is also provided to Subtractor 545 and Full/Empty Logic 560. A subsequent counter output P+1 523 is also provided and has the relationship to P 520 as shown in the figure. Thus, subsequent counter output P+1 523 indicates the next value of P 520 if data was written to FIFO 10. Therefore, if data was written to R(S-2) 406, data would next be written to R(S-1 )407.

Again referring to FIG. 5, input D 536 selects the direction of data transfer. Corresponding Write Pointer 515 input WCK1 516 or WCK2 517 clocks a FIFO write sequence.

Input WP 540 selects one of the S registers to receive data. In the case of a y-bit write through port P2 539, two clock signals are required to store the data word. After the lower x-bits of data are on x-line bus 119, a pulse is provided to WRLO 533 front CKLO 521. The pulse on WRLO 533 causes the x-bits of data to be stored in the selected register. Also, the width associated with the data word is taken from width input WI 535 and stored in the width bit of the selected register. Next, the remaining y-x bits of data are put on x-line bus 119. A pulse provided from CKHI 522 to input WRHI 534 causes the remaining y-x bits of data to be stored in the selected register.

For y-bit writes through port P1 538, a y-bit data word placed on y-line bus 118 is written to the selected register by pulsing WRLO 533 and WRHI 534 simultaneously. These signals are received from the CKLO 521 and CHKI 522 outputs respectively. Thus, if direction input D 536 indicates that device 1 is the source of data and width input WI 535 indicates y-bit data, WRLO 533 and WRHI 534 are pulsed at the same time to write the y-bit data to the selected register. Also at this time, the value of WI 535 is stored in the corresponding width bit of the selected register.

In the case of x-bit data written through P1 538 or P2 539, the data is stored in the lower x-bits of the selected register. Therefore, only the WRLO 533 is used to write the data byte to the selected register. The width bit for the selected register is also clocked in from WI 535 at this time.

Read operations from FIFO 10 are carried out in a similar manner. Input RP 541 selects one of the S registers from which to read data and direction input D 536 indicates the destination of the data. The associated width of the data in each register is output at width output WO 537 and remains on the line throughout the read operation. A pulse on RDLO 531 causes the lower x-bits of data to be read from the selected register. Pulsing RDHI 531 causes the remaining y-x bits to be read.

When D 536 and WO 537 indicate y-bit data reads from FIFO 10 through P2 539, the y-bit data is transferred over x-line bus 119. Therefore, the lower x-bits of data are read from the selected register by pulsing RDLO 531. After Manager 30 has received the lower x-bits, RDHI 532 is pulsed to read the remaining y-x bits. Width output WO 537 is present on line 117 throughout.

For y-bit data reads through P1 538, as indicated by direction input D 536 and WO 537, the y-bits of data can be read by pulsing RDLO 531 and RDHI 532 simultaneously. Again, width output WO 537 is present on line 117 throughout the read. X-bit data reads through P1 538 or P2 539 are read from the lower x-bits of the selected register. In these cases both RDLO 531 and RDHI 532 are pulsed, but only RDLO 531 is used.

Subtractor 545 is used to determine the number of data words in FIFO 10 at any given time. Subtractor 545 determines the difference between Write Pointer 515 counter output P 520 and Read Pointer 500 counter output P 505. The difference in the counter outputs is provided through CNT 548 to Burst Ready Logic 575. In the preferred embodiment, CNT 548 is output in binary form.

Full/Empty Logic 560 signals Manager 30 if FIFO 10 is full or empty. The full and empty conditions are determined by the Read Pointer 500 counter outputs P 505 and P+1 508 and also the Write Pointer 515 counter outputs P 520 and P+1 523. Each of the pointers function as previously discussed with reference to FIG. 4a.

FIG. 4b shows the pointer relationship when FIFO 10 is empty. When FIFO 10 is empty, there are no data elements in any of the S registers. Thus, in the empty state, no data can be read from FIFO 10. In this illustration, register R(1) 410 is the next register to be written to as selected by WP 564. In the empty condition, WP 564 is equal to RP 563. The empty condition is output to Manager 30 by E 561.

Figure 4D:
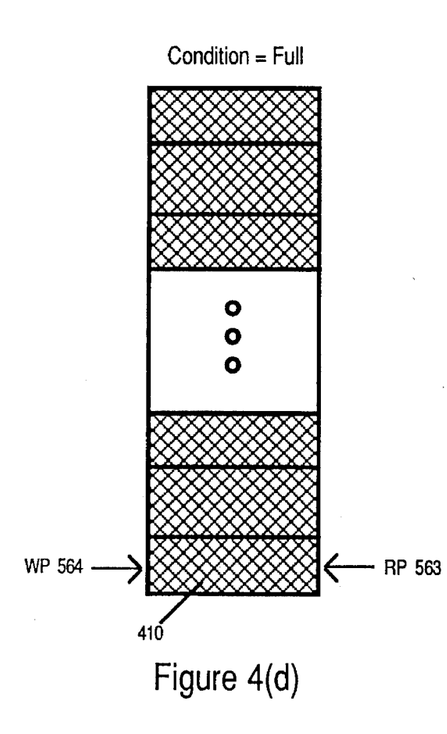

The FIFO 10 full condition is illustrated in FIG. 4(d). The "X"s in each register indicate that the registers contain either x-bit or y-bit data. In the FIFO 10 full state, each of the S registers contain data and hence, no more data can be written to FIFO 10. Also, WP 564 is equal to RP 563. As shown in FIG. 4d, both WP 564 and RP 563 point to register R(1) 410. The full state is signaled to Manager 30 by F 562.

Since the empty and full conditions are signaled to Manager 30 when WP 564 is equal to RP 563, a method to distinguish between the two states is needed. The present invention uses a novel method to determine the empty and full conditions of FIFO 10. The method used is digital hysteresis: the history of past states.

To determine the empty state of FIFO 10, the present invention uses a "nearly empty" condition that is calculated by Full/Empty Logic 560. The nearly empty state occurs when reading one more data word from FIFO 10 would cause RP 563 to be equal to WP 564. In this case, RP+1 565 equals WP 564 as shown in FIG. 4c. In this figure, R(1) 410 is the only register that contains data. Thus, the read pointer RP 563 indicates that this data will be the next read from FIFO 10. In this nearly empty condition, the write pointer WP 564 indicates that R(2) 411 will be the next register written to in FIFO 10. If the data in register R(1) 410 was read, the read pointer RP 563 would be incremented to point to register R(2) 411. Thus, WP 564 and RP 563 would be equal. The present invention anticipates this read from register R(1) 410 and indicates that register R(2) 411 would be the next register from which data would be read. This is indicated by RP+1 565. It follows that when RP+1 565 is equal to WP 564, the FIFO 10 is nearly empty. It also follows that when WP 564 is equal to RP 563 and the FIFO 10 was previously nearly empty, the FIFO 10 is empty. Thus, based on the past state of FIFO 10, Manager 30 can be signaled through the E 561 that FIFO 10 is empty.

Figure 4E:
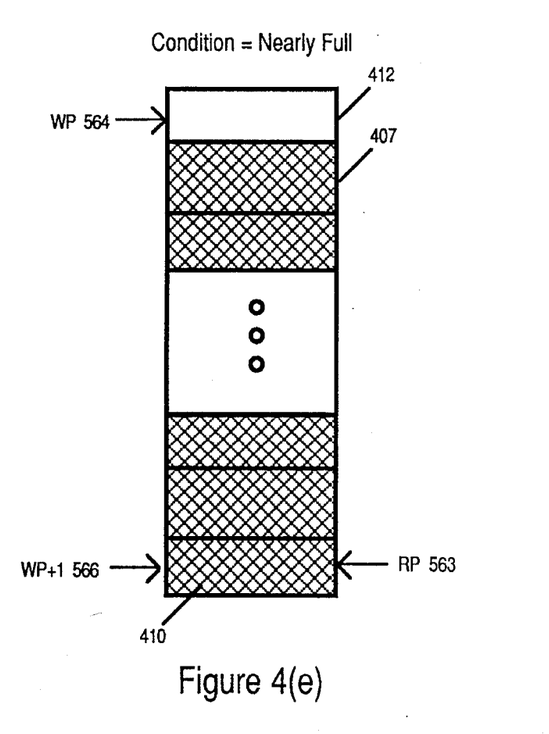

The full condition of FIFO 10 is determined in a similar manner to the empty condition. To determine the full condition, the present invention uses a "nearly full" state that is calculated by Full/Empty Logic 560. The nearly full condition occurs when writing one more data word to FIFO 10 would cause WP 564 to be equal to RP 563. Thus, nearly full occurs when WP+1 566 equals RP 563. In the nearly full condition, as shown in FIG. 4e, registers R(1) 410 through R(S-1) 407 each contain data as indicated by the "X"s. Write Pointer WP 564 points to register R(S) 412 to indicate the next register to write to in FIFO 10. Subsequent write pointer WP+1 566 points to R(1) 410 as does the read pointer RP 563. Thus, when WP+1 566 is equal to RP 563, the FIFO 10 is "nearly full". After a write to R(S) 412, WP 564 would be incremented to point to R(1) 410. Thus, WP 564 would be equal to RP 563. It follows that FIFO 10 signal F 562 is output to Manager 30 when WP 564 is equal to RP 563 and the previous state of FIFO 10 was nearly full. Again, the past state of FIFO 10 is used to determine the full condition.

In the present invention, data storage area 60 of Manager 30 may be implemented in DRAM. When this is the case, to increase throughput, data transfers at port P2 539 are carried out in page mode. In page mode, burst and demand transfer modes are supported. Burst mode input BM 579 selects whether transfers are in burst or demand mode. In either mode, the burst length BL input 578 provides the burst length to determine if a transfer can occur. To overcome prior art data transfer delays, the present invention provides for a programmable burst length. As shown by FIG. 5, Manager 30 programs FIFO 10 through an m-line bus 128. For example, in the preferred embodiment, m=2, and therefore, four possible burst lengths may be programmed. In the preferred embodiment, Manager 30 can select a burst length L=1, 2, 4 or 8 bytes.

Burst Ready Logic 575 outputs RDY 581 to Manager 30 if a page mode data transfer can occur at port P2 539. The RDY 581 is output only after the FIFO 10 conditions and configurations are analyzed.

For burst writes to FIFO 10, RDY 581 is output to Manager 30 if there is enough free space in FIFO 10 for the entire burst. Burst mode input BM 579 configures FIFO 10 for page mode burst transfers. Direction input 577 configures FIFO 10 for writes to FIFO 10 through port P2 539. CNT 576 accepts the difference between P 505 and P 520. If the free space in FIFO 10 is greater or equal to the selected burst length L, Burst Ready Logic 575 outputs RDY 581 to Manager 30 to indicate that a burst write to FIFO 10 can occur.

The Burst Ready Logic 575 determines that there is enough free space in the FIFO 10 for a burst write by using BL 578 (burst length), BW 580 (burst width), E 585 (empty), F 584 (full), CNT 576 (number of words in FIFO as determined by Subtractor 545) and WHIN 587 (write high next) inputs. WHIN 587 is asserted when the next write via Port Two 46 will be to the high byte of Register Memory 530 (i.e., that WRHI 534 will be pulsed). BW 580 is supplied by the Manager 30 and indicates the width of the data that the Manager 30 anticipates writing. That is, BW 580 indicates whether the data to be written will be 16-bit or 8-bit. If there will be a mixture of widths (both 8-bit and 16-bit data in the burst), then the Manager 30 indicates (by using BW) that the burst will be of 8-bit data, since that is the more stringent requirement in terms of space necessary to do the burst.

The Burst Ready Logic 575 determines whether the number of free spaces in the FIFO 10 is greater than or equal to the burst length. For example, if burst length is 4 bytes and burst width indicates 16-bit data, then RDY 581 will be asserted if CNT 576 does not equal 7, and CNT 576 does not equal 6 with WHIN 587 asserted, and F 584 is not asserted. Note that a dual condition could also be used, such that RDY 581 could be asserted if CNT 576 is equal to a value between 1 and 5, or CNT 576 is equal to 6 and WHIN 587 is not asserted, or E 585 is asserted. If burst length is 4 bytes and burst width indicates 8-bit data, then RDY 581 will be asserted if CNT 576 does not equal 7, 6 or 5, and F 584 is not asserted. WHIN 587 does not have to be considered, since 8-bit data writes do not use the high byte of register memory.

For burst reads from FIFO 10, RDY 581 is output to Manager 30 if enough data has been written to FIFO 10 to do an entire burst. Burst Mode BM input 579 configures FIFO 10 to perform page mode as burst transfers. Direction input D 577 configures FIFO 10 for reads from FIFO 10. If the number of bytes in FIFO 10 is greater or equal to the selected burst length L, a burst read from FIFO 10 can occur through port two P2 539 and RDY 581 is output to Manager 30.

The Burst Ready Logic determines that there is enough data in the FIFO 10 for a burst read by using the BL 578, BW 580, E 585, F 584, CNT 576, and RHIN 586 inputs. RHIN 586 is asserted when the next read via Port Two 46 will be to the high byte of Register Memory 530 (i.e., that RDHI 532 will be pulsed). BW 580 is supplied by the Manager 30 and indicates the width of the data that the Manager 30 anticipates reading. That is, BW 580 indicates whether the data to be read will be 16-bit or 8-bit. If there will be a mixture of widths (both 8-bit and 16-bit data in the burst), then the Manager 30 indicates (by using BW)that the burst will be of 8-bit data, since that is the more stringent requirement in terms of data necessary to do the burst.

The Burst Ready Logic 575 determines whether the number of data bytes to be read is greater than or equal to the burst length. For example, if burst length is 4 bytes and burst width indicates 16-bit data, then RDY 581 will be asserted if CNT 576 does not equal 1, and CNT 576 does not equal 2 with RHIN 586 asserted, and E 585 is not asserted. Note that a dual condition could also be used, such that RDY 581 could be asserted if CNT 576 is equal to a value between 3 and 7, or CNT 576 is equal to 2 and RHIN 581 is not asserted, or F 584 is asserted. If burst length is 4 bytes and burst width indicates 8-bit data, then RDY 581 will be asserted if CNT 576 does not equal 1, 2 or 3, and E 585 is not asserted. RHIN 586 does not have to be considered, since 8-bit data reads do not use the high byte of register memory.

Figure 3:
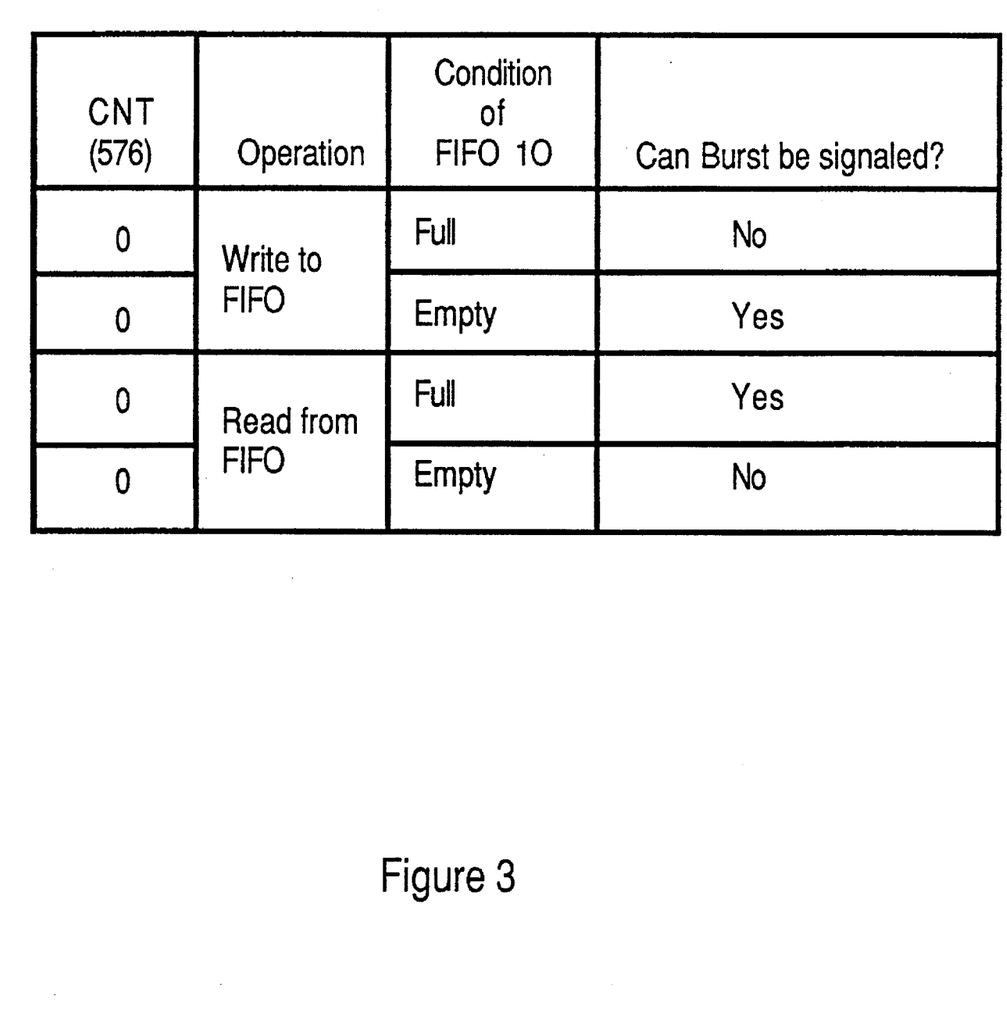
FIG. 3 illustrates four possible Burst Ready Logic situations.

During burst writes and reads, FIFO 10 may become full or empty. In either situation, CNT 576 equals 0 and full input F 584 and empty input E 583 are considered by Burst Ready Logic 575 to determine if a burst can be performed. The table of FIG. 3 illustrates four possible situations. Writes to FIFO 10 cannot occur if FIFO 10 is full. Therefore, if CNT 576 equals 0 and F 584 indicates FIFO 10 is full, a burst write to FIFO 10 cannot occur and RDY 581 is not output to Manager 30. However, if CNT 576 equals 0 and FIFO 10 is empty, as indicated by E 585, a burst write to FIFO 10 can occur and RDY 581 is output to Manager 30. For reads from FIFO 10, if CNT 576 equals 0 and E 585 indicates that FIFO 10 is empty, a burst read from FIFO 10 cannot occur. But, if CNT 576 equals 0 and FIFO 10 is full, as indicated by F 584, a burst read can be performed and RDY 581 is output to Manager 30.

Page mode data transfers through port P2 539 are also performed as demand transfers. For demand transfers, Manager 30 uses the selected burst length L as the maximum number of bytes that can be transferred. For demand transfer writes to FIFO 10, RDY output 581 signals Manager 30 if FIFO 10 is not full. Burst mode BM input 579 selects demand mode and direction D 577 configures FIFO 10 for writes to FIFO 10. If full input F 584 indicates that FIFO 10 is not full, a demand transfer write can occur. For demand writes, the number of bytes written to FIFO 10 is equal to the smaller of the number of free registers or the selected burst length L.

For demand transfer reads from FIFO 10, RDY output 581 signals Manager 30 if FIFO 10 is not empty. In this case, burst mode BM input 579 configures FIFO 10 for demand transfers and direction D input 577 configures FIFO 10 for reads. If empty input E 585 indicates that FIFO 10 is not empty, a demand read can occur. For demand reads, the number of bytes read from FIFO 10 is equal to the smaller of the number of bytes in FIFO 10 or the selected burst length L.

The FIFO of the present invention anticipates when a demand transfer is to be stopped. For writes to FIFO 10, "almost full" output AF 583 signals Manager 30 if there is space in FIFO for only one more byte of data. The Burst Ready Logic 575 asserts AF 583 (almost full) when CNT 576 is equal to 7, and the WI 589 (width in) input indicates 16-bit data, and WHIN 587 (write high next) is asserted; or when CNT 576 is equal to 7 and WI 589 indicates 8-bit data. The "almost full" signal 583 allows Manager 30 to realize ahead of time when a demand transfer to FIFO 10 must end. Thus, Manager 30 can switch to a different task efficiently.

For reads from FIFO 10, "almost empty" AE 582 is output to Manager 30 if only one byte remains in FIFO 10. The Burst Ready Logic 575 asserts AE 582 (almost empty) when CNT 576 is equal to 1 and the WO 588 (width out) input indicates 16-bit data, and RHIN 586 (read high next) is asserted; or when CNT 576 is equal to 1 and WO 588 indicates 8-bit data. Like the "almost full" signal, Manager 30 can anticipate when a demand transfer from the FIFO 10 must be stopped. This allows Manager 30 to switch to a different task efficiently. Each of these signals are byte based. Therefore, data width is taken into account.

In addition to the improvements described above, the burst length programmability of the present invention is advantageous in two ways. First, if performance goals (i.e., transfer rates) are specified at both the host side and the disk side, then a fixed burst length may not be the optimal one for the given performance goals and FIFO overflow/underflow constraints. This could result in the disk drive designer's having to use faster DRAM (i.e., DRAM with a shorter access time), which is more costly. Programmability allows the selection of the optimal burst length, and therefore the use of the slowest DRAM which will meet the performance goals. Second, if wait states are allowed at the host side so that a performance goal is only specified for the disk side, then with a given DRAM access time, a burst length can be selected such that the host transfer rate is maximized and host wait states are minimized while meeting the disk FIFO overflow/underflow constraint.

Thus, a selectable width, burstable FIFO is described.

We claim:

1. A FIFO for receiving and outputting data such that the data first provided to said FIFO is the data first provided from FIFO comprising:

a plurality of storage elements;

a first input signal for designating a maximum burst length L of data from a plurality of burst lengths;

pointer means for selecting a storage element out of said plurality of storage elements;

first logic means coupled to said pointer means for receiving said first input signal and providing a control signal to indicate when a burst of said length L can be provided to and provided from said plurality of storage elements.

2. The FIFO of claim 1 wherein said plurality of burst lengths comprises 1, 2, 4 and 8 bytes.

3. The FIFO of claim 1 wherein said first logic means also provides a first output signal when said FIFO is in a first condition and a second output signal when said FIFO is in a second condition.

4. The FIFO of claim 3 wherein said first condition exists when only one x-bit byte remains in said FIFO.

5. The FIFO of claim 3 wherein said second condition exists when space for only one x-bit byte remains in said FIFO.

6. The FIFO of claim 1 further comprising: clock means for clocking data into and from said storage means.

7. The FIFO of claim 1 wherein said pointer means comprise a first and a second n-bit counter for selecting memory locations in said plurality of storage elements.

8. The FIFO of claim 7 wherein said first and said second n-bit counters are 3-bit gray code counters.

9. The FIFO of claim 1 wherein said storage means comprises a plurality of registers.

10. The FIFO of claim 9 wherein the number of said plurality of registers comprises 8.

11. The FIFO of claim 9 wherein each of said plurality of registers is y+1 bits wide so that y-bits store said x-bit or said y-bit data and a width bit tracks whether each of said plurality of registers contains said x-bit or said y-bit data.

12. The FIFO of claim 9 wherein x=8.

13. The FIFO of claim 9 wherein y=16.

14. The FIFO of claim 1 further comprising:

second logic means for providing a first signal when said FIFO is in a first condition and for providing a second signal when said FIFO is in a second condition.

15. The FIFO of claim 14 wherein said first condition exists when said FIFO is empty.

16. The FIFO of claim 14 wherein said second condition exists when said FIFO is full.

17. A FIFO comprising:

storage means having a plurality of storage elements for receiving and outputting data such that data first received by said storage means is data first outputted by said storage means, said data comprising a plurality of words having a plurality of bit widths Z, said data such that a word having the largest bit width has a bit width w, said plurality of storage elements such that an element is at least w+y bits wide where $2^y \geq Z$ so that w bits are used to store said data and y bits are used to indicate the width of said data stored in said element;

pointer means for selecting a storage element out of said plurality of storage elements.

18. The FIFO of claim 17 wherein said plurality of storage elements comprises a plurality of registers.

19. The FIFO of claim 18 wherein each of said plurality of registers is w+1 bits wide so that w-bits are used to store x-bit and w-bit data and one bit is used to track the width of data within each register.

20. The FIFO of claim 18 wherein the number of said plurality of registers comprises 8.

21. The FIFO of claim 19 wherein w=16.

22. The FIFO of claim 19 wherein x=8.

23. The FIFO of claim 17 further comprising:

a first input signal for designating a maximum burst length L of data from a plurality of burst lengths; and first logic means coupled to said pointer means for receiving said first input signal and for providing a control signal to indicate when a burst of said length L can be received by and outputted by said storage means.

24. The FIFO of claim 23 wherein said plurality of burst lengths comprises 1, 2, 4 and 8 bytes.

25. The FIFO of claim 23 wherein said first logic means also provides a first output signal when said FIFO is in a first condition and a second output signal when said FIFO is in a second condition.

26. The FIFO of claim 25 wherein said first condition exists when only one x-bit byte remains in said FIFO.

27. The FIFO of claim 25 wherein said second condition exists when space for only one x-bit byte remains in said FIFO.

28. The FIFO of claim 17 further comprising:

clock means for clocking data into and from said storage means.

29. The FIFO of claim 17 wherein said pointer means comprises a first and second n-bit counter for selecting memory locations said plurality of storage elements.

30. The FIFO of claim 29 wherein said first and said second n-bit counters are 3-bit Gray code counters.

31. The FIFO of claim 17 further comprising first logic means for providing a first signal when said FIFO is in a first condition and a second signal when said FIFO is in a second condition.

32. The FIFO of claim 31 wherein said first condition exists when said FIFO is empty.

33. The FIFO of claim 31 wherein said second condition exists when said FIFO is full.

34. An apparatus for determining a first or second condition in a FIFO comprising a plurality of storage elements, said apparatus comprising:

pointer means for providing a plurality of counter outputs to indicate a location in said plurality of storage elements, said plurality of counter outputs comprising a read pointer and a write pointer to indicate a location to read from and write to in said storage elements respectively;

comparing means for receiving said plurality of counter outputs, for generating a third condition if a value of said read pointer is less than a value of said write pointer, for generating a fourth condition if a value of said read pointer is greater than a value of said write pointer, for generating said first condition if a value of said read pointer is equal to a value of said write pointer and said third condition exists, and for generating said second condition if a value of said read pointer is equal to a value of said write pointer and said fourth condition exists.

35. The apparatus of claim 34 wherein a first number of said counter outputs are provided by a read pointer comprising a first n-bit counter.

36. The apparatus of claim 35 wherein said first n-bit counter is a 3-bit Gray code counter.

37. The apparatus of claim 35 wherein a second number of said counter outputs are provided by a write pointer comprising a second n-bit counter.

38. The apparatus of claim 37 wherein said second n-bit counter is a 3-bit Gray code counter.

39. The apparatus of claim 34 wherein said first condition exists when said FIFO is empty.

40. The apparatus of claim 34 wherein said second condition exists when said FIFO is full.

41. The apparatus of claim 34 wherein said third condition exists when said FIFO is nearly empty.

42. The apparatus of claim 34 wherein said fourth condition exists when said FIFO is nearly full.

43. A FIFO comprising:

storage means for receiving and outputting data such that data first received by said storage means is the data first outputted by said storage means;

first means for providing clock signals to said storage means when said storage means is receiving data and for providing a plurality of first counter outputs;

second means for providing clock signals to said storage means when said storage means is outputting data and for providing a plurality of second counter outputs;

first logic means for receiving said first and second counter outputs and for providing a first output signal when said FIFO is in a first condition and a second output signal when said FIFO is in a second condition;

second logic means for receiving certain of said first and second counter outputs and for providing a third counter output;

a first input signal for designating a maximum burst length L of data from a plurality of burst lengths; and third logic means for receiving said first input signal, said third counter output and said first and second output signals and for controlling when a burst of said length L can be received by and outputted from said storage means.

44. The FIFO of claim 43 wherein said third logic means also provides a third output signal when said FIFO is in a third condition and a fourth output signal when said FIFO is in a fourth condition.

45. The FIFO of claim 44 wherein said third condition exists when only one x-bit byte remains in said FIFO.

46. The FIFO of claim 45 wherein said fourth condition exists when space for only one x-bit byte remains in said FIFO.

47. The FIFO of claim 43 wherein said third counter output is provided in binary form.

48. The FIFO of claim 43 wherein said first condition exists when a third condition exists and a first of said first counter outputs is equal to a first of said second counter outputs and wherein said second condition exists when a fourth condition exists and said first of said first counter outputs is equal to said first of said second counter outputs.

49. The FIFO of claim 48 wherein said third condition exists when said first of said first counter outputs is equal to a second of said second counter outputs and wherein said fourth condition exists when said first of said second counter outputs is equal to a second of said first counter outputs.

50. The FIFO of claim 43 wherein said first condition exists when said FIFO is empty and said second condition exists when said FIFO is full.

51. The FIFO of claim 48 wherein said first and second means comprise first and second n-bit counters, respectively.

52. The FIFO of claim 51 wherein said first and second n-bit counters are 3-bit Gray code counters.

53. The FIFO of claim 43 wherein said plurality of burst lengths comprise 1, 2, 4 and 8 bytes.

54. The FIFO of claim 43 wherein said storage means comprises a plurality of storage elements;

said data comprises a plurality of words having a plurality of bit widths Z;

said data such that a word having the largest bit width has a bit width w;

said plurality of storage elements such that an element is at least w+y bits wide where $2^y > Z$ so that w bits are used to store said data and y bits are used to indicate the width of said data stored in said element.

55. The FIFO of claim 54 wherein said plurality of storage elements comprises a plurality of registers.

56. The FIFO of claim 54 wherein Z=2, W=16 and y=1.

57. The FIFO of claim 55 wherein the number of said plurality of registers comprises 8.

58. The apparatus of claim 34 further comprising clock means for clocking data into and from said plurality of storage elements.

* * * * *